United States Patent [19]
Hanekom

[11] 3,924,102
[45] Dec. 2, 1975

[54] APPARATUS FOR CONTROLLING TEMPERATURE

[76] Inventor: Nicolaas W. Hanekom, Unic, Bosman St., Paarl, Cape Province, South Africa

[22] Filed: May 22, 1974

[21] Appl. No.: 472,122

[52] U.S. Cl. .............. 219/497; 219/494; 219/499; 219/501
[51] Int. Cl.² ............................................ H05B 1/02
[58] Field of Search .......... 219/494, 497, 499, 501, 219/504, 505

[56] References Cited
UNITED STATES PATENTS

| | | | |
|---|---|---|---|
| 2,866,067 | 12/1958 | Dolan et al. | 219/499 |
| 3,483,359 | 12/1969 | Hewlett, Jr. et al. | 219/497 |
| 3,752,956 | 8/1973 | Cahill et al. | 219/497 |
| 3,789,190 | 1/1974 | Orosy et al. | 219/497 X |

Primary Examiner—J. D. Miller
Assistant Examiner—Fred E. Bell
Attorney, Agent, or Firm—Kinzer, Plyer, Dorn & McEachran

[57] ABSTRACT

Apparatus for controlling the temperature of a heating element comprising means to monitor the instantaneous magnitude of an electrical property of the element such as the impedance thereof. Conveniently this done by monitoring the instantaneous magnitude of the heating current flowing through the element. As the temperature of the element increases its impedance will increase and the instantaneous magnitude of the heating current will decrease. When the magnitude current of the heating current drops below a predetermined value, determined by the desired temperature the heating current is interrupted. Thereafter the heating current is periodically re-applied to the heating element for sampling purposes to maintain the heating element at the desired temperature.

2 Claims, 1 Drawing Figure

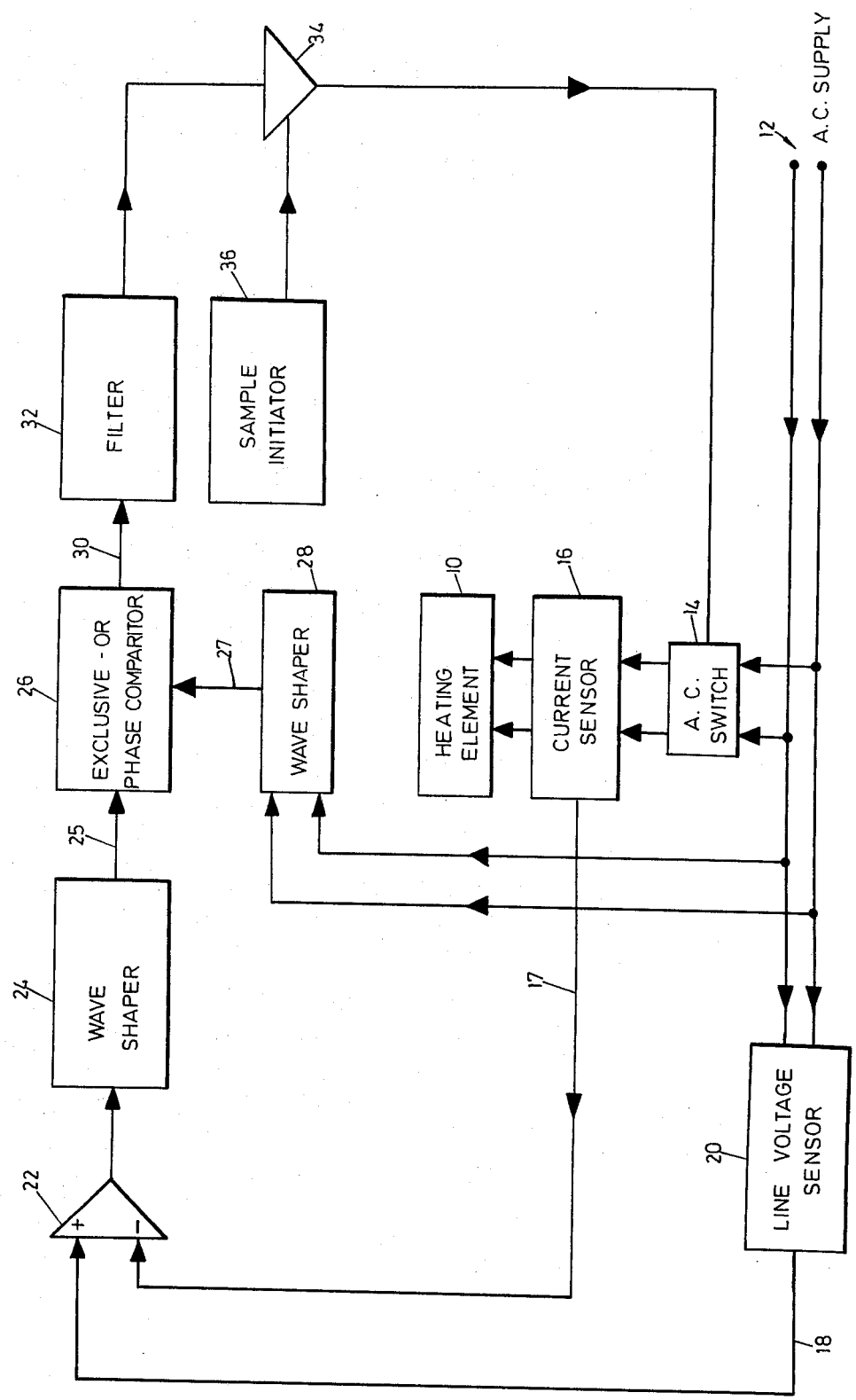

APPARATUS FOR CONTROLLING TEMPERATURE

This invention relates to temperature control.

It is sometimes necessary to control the temperature of a heating element. This is presently achieved by attaching a temperature sensor to the heated object and when using the electrical output from the sensor to control the supply of electric current to the element through a triac or like device. This arrangement is complicated and therefore expensive.

It is an object of the present invention to provide an improved type of apparatus for controlling the temperature of an electrical heating element.

In its broadest aspect apparatus according to the invention comprises means to sense the instantaneous magnitude of a specified electrical property of the heating element while the heating current is flowing therethrough, and means to interrupt the current to the heating element when the magnitude of the property exceeds or falls below a predetermined threshold value.

In a more limited sense apparatus according to the invention comprises means to derive a first signal proportional to the current being drawn by the heating element, means to derive a second signal proportional to the desired temperature of the heating element, means to compare the two signals and means to interrupt the current to the element when the magnitude of the first signal is less than that of the second signal.

Further according to the invention there is provided means for periodically initiating the supply of current to the element for sampling purposes.

An embodiment of the invention is described below with reference to the accompanying drawing which shows a schematic diagram of a heating element controlled by a temperature controller of the invention.

In the drawing, a heating element 10 formed from chrome-nickel wire, is supplied with electric current from an AC supply 12 via an AC switch 14, for example, a triac, and a current sensor 16. The output 17 of the current sensor is compared in a differential amplifier 22 with a reference signal on line 18, which is derived from a line voltage sensor 20. The output of the differential amplifier is shaped by a wave-shaping circuit 24 and applied to one input 25 of an exclusive-OR phase comparator 26, the other input 27 to which is derived from a wave-shaping circuit 28 connected to the AC supply. The output 30 of the phase comparator drives the AC switch via a filter 32 and an amplifier 34. A sample initiating circuit 36 also drives the AC switch via the amplifier 34.

Operation of the temperature controller is as follows:

The sample initiator 36 switches the triac 14 on approximately once every second. If the heating element is cold, its resistance will be low and the current drawn from the supply large. The voltage appearing on line 17 will thus be a large alternating voltage which is in phase with the line voltage if, for example, a series resistor is used as a current sensor 16.

The voltage appearing on line 18 is a fraction of the line voltage since the line voltage sensor is a resistive voltage divider (not shown) across the supply.

The two in-phase voltages on the lines 17 and 18 are compared by the differential amplifier 22. If, as in this example, the signal from the current sensor is larger in magnitude than the signal from the line voltage sensor then the output from the differential amplifier will be in anti-phase with the input signals on lines 17 and 18, while if the relative magnitudes are reversed it will be in phase with the input signals.

The wave-shapers 24 and 28 are Schmitt triggers or zero-crossing detectors which "square" the differential amplifier output and line voltage signals an their respective inputs to provide square-wave inputs for the exclusive-OR phase comparator. With the two inputs 25 and 27 in anti-phase, as in this example, the output of the phase comparator is positive so that, when filtered by the filter 32 and amplified at 34, it switches the AC switch (triac) on. With the inputs 25 and 27 in phase, the output from the phase comparator will be negative and the triac will be switched off.

As described above, when the heating element is first switched on, its resistance will be low and thus by the abovedescribed operation will hold the triac on. As the element heats up, however, its resistance increases and the current drawn from the supply will thus decrease. This decrease, and the associated decrease in the output from the current sensor continues until the magnitude of the output from the current sensor becomes less than the magnitude of the output from the line voltage sensor. At this stage, the phase of the output from the differential amplifier is reversed, the polarity of the output from the phase comparator is reversed and the triac is switched off.

The sample initiating circuit 36 switches the triac on periodically as stated above to sample the temperature of the element.

Since the temperature as indicated by the output from the current sensor is referenced to a fraction of the line voltage, the final temperature of the element is unaffected by changes in the line voltage since an increase in the line voltage causes a proportionate increase in the current drawn by the element. The final temperature may easily be varied by varying the ratio of the voltage divider and thus the fraction of the line voltage appearing at the output of the line voltage sensor.

The output from the exclusive-OR phase comparator is filtered because voltage spikes may occur due to differential phase shifts in the inputs 25 and 27, and these may cause false triggering of the triac.

I claim:

1. Apparatus for controlling the temperature of an electrical heating element comprising means to connect the full voltage of an alternating electric power source to the heating element, means to derive a first voltage signal proportional to the current being drawn by the heating element, means to derive a second voltage signal proportional to the desired temperature of the heating element, means to compare the two voltage signals, means to disconnect the heating element from the power source when the magnitude of the first voltage signal is less than that of the second voltage signal, sampling means for then briefly connecting the full voltage of the power source to the heating element at periodic intervals for sampling purposes, and means to reconnect the full voltage of the power source to the heating element when the magnitude of the first voltage signal is greater than that of the second voltage signal.

2. Apparatus as claimed in claim 1 wherein the second voltage signal is a fraction of the voltage of the electric power source.

* * * * *